US 6,554,177 B2

(12) United States Patent
Foster et al.

(10) Patent No.: US 6,554,177 B2
(45) Date of Patent: Apr. 29, 2003

(54) FRICTION WELDING

(75) Inventors: Derek John Foster, Bristol (GB); Bryan Leslie Benn, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/987,737

(22) Filed: Nov. 15, 2001

(65) Prior Publication Data
US 2002/0066768 A1 Jun. 6, 2002

(30) Foreign Application Priority Data
Nov. 17, 2000 (GB) .............................................. 0028021

(51) Int. Cl.⁷ .......................... B23K 20/12; B22D 11/00
(52) U.S. Cl. ...................... 228/112.1; 228/2.1; 428/544
(58) Field of Search ............. 228/2.1, 2.3, 112.1–114.5; 428/544–687; 403/911

(56) References Cited

U.S. PATENT DOCUMENTS

| | | | |
|---|---|---|---|
| 3,724,883 A | | 4/1973 | Dennis, Jr. |
| 3,848,389 A | * | 11/1974 | Gapp et al. .................. 411/504 |
| 4,074,449 A | * | 2/1978 | Lanz et al. .................. 228/114 |
| 4,087,038 A | * | 5/1978 | Yagi ........................ 228/114.5 |
| 4,817,852 A | * | 4/1989 | Hill .............................. 228/114 |
| 5,054,980 A | * | 10/1991 | Bidefeld ..................... 411/171 |
| 5,171,115 A | * | 12/1992 | McWilliams et al. ....... 411/361 |
| 5,320,439 A | * | 6/1994 | Perrault et al. .......... 403/379.1 |
| 5,492,264 A | * | 2/1996 | Wadleigh ................. 228/112.1 |
| 5,678,750 A | * | 10/1997 | Harris ......................... 228/2.1 |
| 6,238,121 B1 | * | 5/2001 | Roser .......................... 403/13 |
| 6,334,568 B1 | * | 1/2002 | Seeds ....................... 228/114.5 |

FOREIGN PATENT DOCUMENTS

| GB | 1121280 | 7/1968 |
|---|---|---|
| GB | 1 259 222 | 1/1972 |

\* cited by examiner

Primary Examiner—Tom Dunn
Assistant Examiner—Zidia Pittman
(74) Attorney, Agent, or Firm—Oliff & Berridge, PLC

(57) ABSTRACT

In one aspect the invention provided a friction welded component comprising at least two structural support members spaced apart and connected by a plurality of first and second studs. Each of the first studs are friction welded at one end to a first of the support members and at the opposite end thereof to one end of a respective second stud. Each of the second studs are friction welded to a respective first stud and a second of the support members along a continuous annular friction welded joint having a frusto-conical configuration. Another aspect of the invention provides a friction welding method comprising the steps of: friction welding a plurality of first studs at one end thereof to a first structural support member positioning a second structural member having a plurality of apertures adjacent the opposite ends of the first studs with the apertures positioned in register with the said first studs; and, friction welding a plurality of second studs to the said second support member with each of the second studs extending through a respective aperture and being friction welded along a continuous friction weld surface to the second support member and a respective first stud.

17 Claims, 2 Drawing Sheets

FRICTION WELDING

This invention relates to friction welding and in particular concerns friction welding thin-walled structures.

The invention finds particular application in the manufacture of gas turbine aero-engine casings which hitherto have been manufactured from titanium, nickel or steel forgings. The manufacture of thin walled components such as aero-engine casings from metal forgings is particularly expensive in terms of material wastage and machining time. Typically ninety five percent of forging material is removed during the machining of an engine casing forging. This low material utilisation is a consequence of the forging process since the size of load bearing reinforced features such as bosses and the like on the casing surface determine the wall thickness of the forging that is necessary for correct material flow during the forging process. For example, a forging for an engine casing having a 25 mm (1 inch) diameter boss on its surface requires a minimum wall thickness of at least 25 mm to ensure correct material flow in the region of the boss during forging.

Bosses are a common feature on gas turbine aero-engine casings since they are used extensively for mounting pipes and vane spigots, for example which pass through apertures in the casing. For instance, the intermediate compressor casing for the V2500 engine manufactured by International Aero Engines comprises over two hundred bosses for locating and supporting the radially outer spigots of the variable geometry compressor vanes.

Boss diameters of 25 mm or more are common on casings having a wall thickness in the region of 2–5 mm and the resultant material wastage and machining time adds considerably to the manufacturing cost of thin-walled engine casing structures and adds significantly to the lead time of the machined component.

One proposal to address this problem has been to manufacture gas turbine aero-engine casings from sheet material using highly accurate fusion welding techniques such as electron beam welding. However, fusion welded bosses have a number of drawbacks particularly in terms of joint strength, mechanical integrity and the cost associated with non-destructive (NDI) weld inspection In this respect fusion welded bosses are usually unsuitable for gas turbine aero-engine casing applications and the manufacture of casings from forgings has hitherto been preferred.

Friction welding has also been proposed for joining bosses to engine casings manufactured from thin sheet material. Friction welding is the welding method of choice in many welding applications since parent material strength can be achieved at the weld joint with little or no heat affected zone. Attempts at friction welding bosses to thin walled structures such as engine casings have not been wholly successful however, since the high forging loads generated cannot always be supported by the thin walled casing when the casing material becomes plastic during the welding process. This results in the boss element punching through the thin walled casing, in a process known as "burn through", before a satisfactory weld is achieved.

These constraints limit the size of boss that can be welded to a casing of a specified wall thickness. This is a significant obstacle where large diameter bosses are required, for instance on gas turbine areo-engine compressor casings where large diameter vane spigot bosses are used for supporting the aerodynamic loads that act on variable geometry compressor vanes.

According to an aspect of the invention a friction welded component comprises at least two structural support members spaced apart and connected by a plurality of first and second studs, each of the first studs being friction welded at one end to a first of the support members and at the opposite end thereof to one end of a respective second stud, whereby each of the second studs are friction welded to a respective first stud and a second of the support members along a continuous annular friction welded joint.

It is to be understood that the terms "stud" and "boss" are used interchangably throughout this description, with the term "stud" being used to refer to any stud like component suitable for friction welding to form a "boss" on the surface of a structural member.

The above aspect of the invention readily enables bosses in the form of studs to be friction welded to thin walled structures such as engine casings since bosses having cross-sections smaller than would otherwise be necessary may be friction welded to thin walled engine casing structures to support relatively high loads. The secondary support member increases the bending stiffness of the welded structure in the region of the bosses which enables smaller diameter bosses to be used. This readily permits load supporting bosses to be friction welded to thin walled structures in applications where hitherto it has not been possible because of constraints such as "burn through" due to the higher forging loads associated with larger diameter studs or bosses. The continuous annular friction welded joint readily enables the weld zone between the welded components to be minimised since only limited local frictional heating is required to form the welded joint.

In this aspect of the invention the first and second studs may be considered to constitute the web and the first and second members the respective flanges of an I-section beam.

Preferably, the said continuous annular weld has a divergent cross-section. This readily enables the first and second studs to be joined along the single continuous surface and thereby minimise the cross-section of the welded joint between the studs and second support member.

In preferred embodiments, the continuous annular weld diverges in the direction from the first support member towards the second support member.

Preferably, the continuous annular weld has a frusto-conical configuration. This readily enables rotary friction welding methods such as inertia welding to be used to join the first and second studs to each other and the second member.

In preferred embodiments, the second stud protrudes from the second support member in the direction away from the first support member.

Preferably, each pair of welded first and second studs include a throughbore extending through the first and second support members and the said studs. In this respect the welded bosses so formed may be used to support load bearing members passing through the first and second support members.

In preferred embodiments, the said first support member comprises a primary structural support member and the said second support member comprises a secondary reinforcement member.

Preferably, the second support member comprises at least one link element extending between adjacent first and second welded stud pairs.

In preferred embodiments, the first support member comprises a primary casing and the second support member comprises a containment casing for containing projectiles piercing the said primary casing. Thus the support members may comprises a layered structure for containment purposes, for example for containing high energy projectiles such as fragments of rotating components or the like piercing the first support member.

The friction welded component may comprise a plurality of containment casings spaced apart and substantially parallel to the primary casing. This can further improve the above mentioned advantages.

In preferred embodiments, the first structural member comprises a generally cylindrical gas turbine engine casing and the said second support member is disposed on the radially outer side of the said engine casing. In gas turbine aero-engine applications containment of fractured engine components is a significant design consideration.

According to another aspect of the invention there is provided a method of friction welding comprising the steps of;

friction welding a plurality of first studs at one end thereof to a first structural support member;

positioning a second structural member having a plurality of apertures adjacent the opposite ends of the first studs, the apertures being positioned in register with the said first studs;

friction welding a plurality of second studs to the said second support member, each of the second studs extending through a respective aperture and being friction welded along a continuous friction weld surface to the second support member and a respective first stud.

The continuous weld surface proposed by this aspect of the invention readily enables a localised joint having a relatively small cross-section to be formed between the components since frictional heating, forging and welding occurs in a uniform manner over the whole of the weld contact surfaces.

An advantage of using friction welding to attach the bosses in this embodiment is the relatively low amount of heat input into the fabricated structure which can minimise distortion, buckling etc of sheet metal casings, for example.

Preferably, the step of friction welding the second studs comprises the step of simultaneously welding the second stud to the respective first stud and aperture along the continuous friction weld surface of the second stud.

In preferred embodiments, the end of the first studs to be welded to the second studs are provided with a recess for receiving the end of the second stud to be welded.

Preferably, each recess and respective adjacent aperture define a continuous surface which contacts the continuous weld surface of the second stud.

In preferred embodiments, the said continuous surface of recess and aperture and the continuous surface of the second stud have corresponding frusto-conical configurations.

Preferably, the step of friction welding the said second studs to the said first studs comprises rotary friction welding.

Embodiments of the invention will now be more particularly described, by way of example only, with reference to the accompanying drawings in which.

Figure 1:
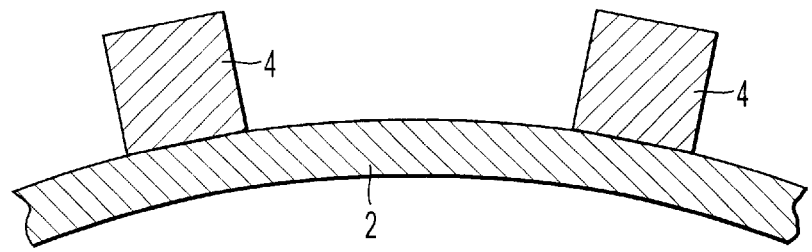
FIG. 1 is a cross-section view showing a pair of fabricated bosses friction welded to a section of a circular cylindrical gas turbine engine casing.
Figure 2:
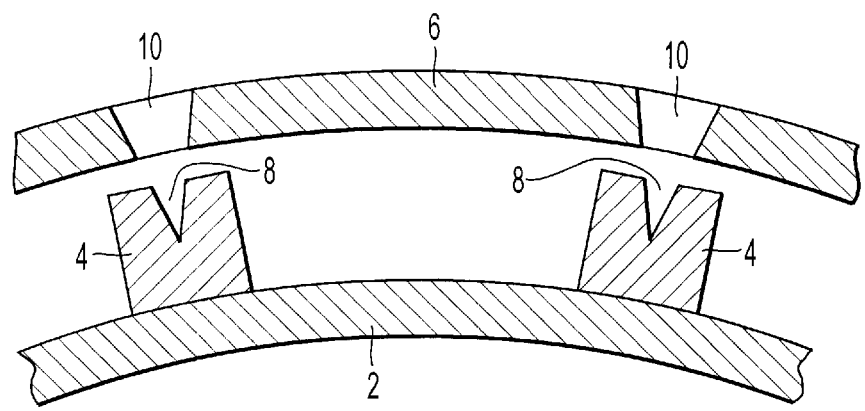
FIG. 2 is a cross-section view similar to that of FIG. 1 showing a further strengthening component to be friction welded to the bosses of FIG. 1.
Figure 3:
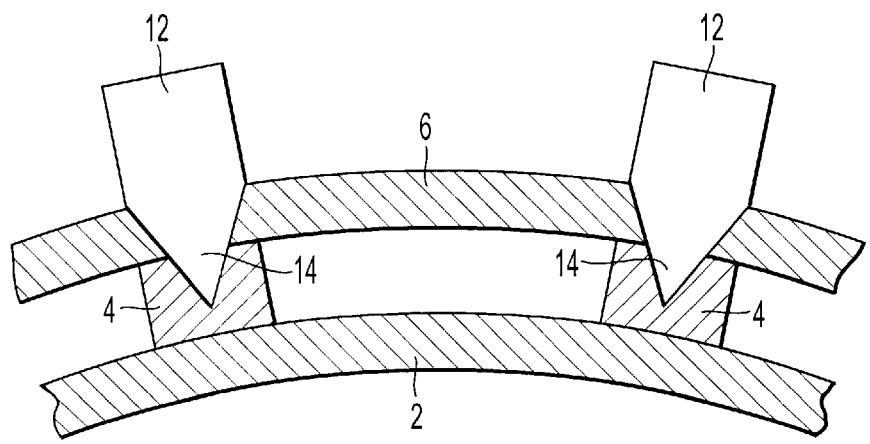
FIG. 3 is a cross-section view similar to that of FIGS. 1 and 2 showing the strengthening component welded to the bosses.

Referring to the illustrated example in FIGS. 1 to 3, where the same parts have the same reference numerals, part of a circular cross-section cylindrical gas turbine engine casing 2 is shown. In the drawings of FIGS. 1 to 3 only part of the circumference of the engine casing is shown, with the illustrated cross-section being in the plane normal to the longitudinal axis of the casing.

The casing 2 comprises a relatively thin sheet of metal material to which a plurality of upstanding circular cross-section cylindrical bosses 4, in the form of a first set of metal studs, are attached to the casing at one end by friction welding and protrude radially outwards from the outer surface of the casing. In the embodiment shown it is preferred that the circular section cylindrical bosses 4 are attached by rotary friction welding.

In the drawings of FIGS. 1 to 3 only one pair of bosses is shown, however it is to be understood that a one or a plurality of circumferential rows of bosses may extend around the radially outer surface of the casing, for example for supporting variable geometry compressor vane spigots or other components located in throughbores (not shown) passing through the bosses and the casing. The bosses and casing may be drilled to provide the throughbores on completion of the subsequent fabrication steps described with reference to FIGS. 2 and 3.

The engine casing 2 is strengthened by linking the radially outermost ends of the upstanding bosses together to form a modified I-beam type structure. In one embodiment the bosses are interconnected by means of a plurality of link elements 6 which extend between adjacent bosses parallel to the outer surface of the engine casing 2. In one embodiment the links form a reinforcement ring around the engine casing linking a row of circumferentially spaced bosses. In other embodiments the link elements form more complex support structures comprising a network of interconnected links which connect a matrix of boss type nodes.

The link members 6 are attached to the outermost ends of the bosses 4 by friction welding. As shown in FIG. 2 each of the bosses 4 is prepared for friction welding with a weld preparation in the form of a conical blind bore 8 machined into the other end face of the boss, that is to say the end face facing radially outwards from the casing structure in FIGS. 1 and 2. The conical blind bore 8 diverges from an apex point within the boss to an opening on the outermost end face of the boss.

The link element 6 are also prepared for friction welding with a weld preparation in the form of a conical through bore 10 being provided at each position in the link element where it is to be joined to a respective boss. The pitch of the conical blind bores in a link element is the same as the pitch of the bosses on the casing which are to be joined by the link element. A link element may extend between two or more adjacent bosses as required.

Each link element is positioned on the radially outermost end faces of the bosses it is to join so that the conical blind bores in the bosses are in register with the conical through bores in the link member.

The ends of the bosses 4 are joined to the respective link elements by a second set of bosses 12, in the form of circular cross-section cylindrical studs. The second bosses 12 have the same or substantially the same cross-section as the first bosses 4 and include a weld preparation in the form of a conical protrusion 14 at one end thereof. The protrusion 14 is shaped to fit in the combined conical bores 8 and 10 such that the protrusion is in complete contact with the conical surfaces of the bores 8 and 10. In this way the mating contact surfaces on the bores 8 and 10 and surface of the protrusion 14 provide a continuous conical joint interface for friction welding the protrusion to the bores to form a single conical weld. The joint interface geometry is particularly suitable for friction welding by a rotary inertia welding process in this example since only local heating is required at the conical joint interface to join the respective components.

The other, non-welded, end of the second boss protrudes radially outwards from the outer surface of the link element in the welded component of FIG. 3, however this may be removed by further machining if required.

Figure 4:
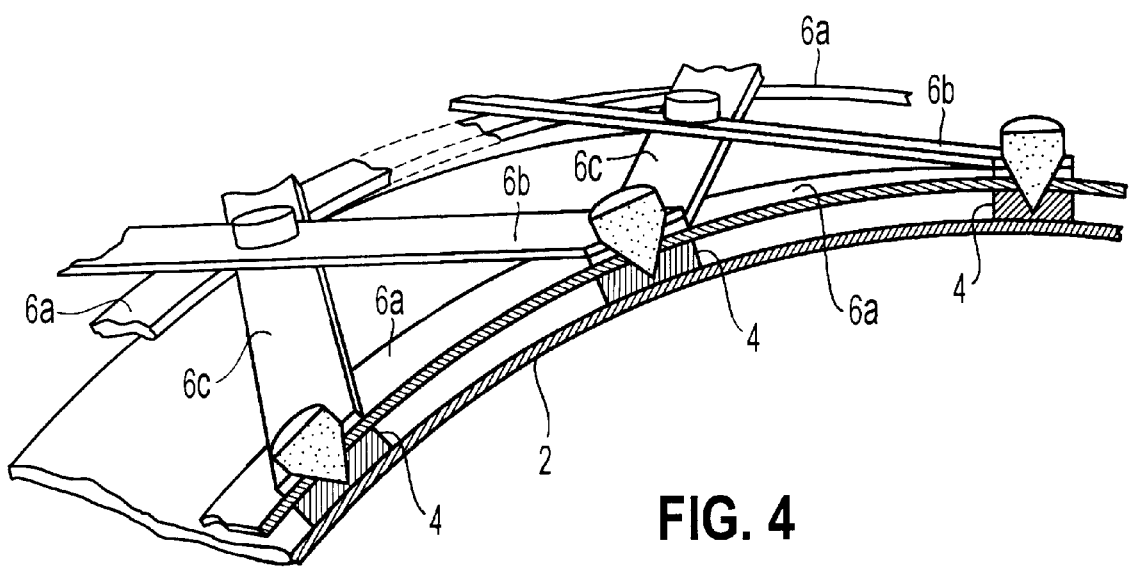
FIG. 4 is an perspective view of an aero-engine casing strengthened according to an embodiment of the invention.

FIG. 4 shows a section of a fabricated cylindrical casing in perspective view to illustrate a more complex matrix of load carrying link elements.

In this embodiment a plurality of link elements 6 are welded together to provide a lattice structural support structure comprising a network of interconnected link elements, several of which intersect at and are mutually joined at the boss location. The lattice of link elements comprises a first plurality of circumferentially extending hoop elements 6a, a second plurality of clockwise, helically extending link elements 6b, and a third plurality of anti-clockwise, helically extending link elements 6c that are friction welded to the outer surface of a gas turbine engine casing as previously described. The link elements 6a, 6b, 6c extend substantially parallel to the other surface of the engine casing?

The method of joining the link elements to the bosses 4 in FIG. 4 is essentially the same as the method described above with reference to FIGS. 1–3. In this embodiment, however, there are up to three link members superimposed at each boss location. The respective through bores in the link elements for receiving the conical protrusion 14 are correspondingly sized and positioned over the blind bores in the bosses 4.

Although aspects of the invention have been described with reference to the embodiments shown in the accompanying drawings it is to be understood that the invention is not limited to those precise embodiments and various changes and modifications may be effected without exercise of further inventive skill and effort. For example, the invention is applicable to fabricating any type of load bearing structure where reinforcement is required. In this respect the invention is not limited to fabricating gas turbine engine casings. In addition, although it is convenient to utilise circular section bosses 4 and 12 for rotary friction welding, the invention also contemplates other methods of friction welding, for example friction stir welding, in which case bosses having shapes other than circular cross-sections may be used. Further, in the embodiments described the step of forming the conical weld bores 10 in the link elements is separate from the of forming the corresponding conical bores in the bosses. In a variation to the sequence of these method steps the link elements 6 may be positioned over the bosses 4 and the conical bores 8, 10 formed in one machining operation which may be followed immediately by inserting and welding the second bosses 12 to the fabricated structure. In one embodiment, the individual link elements illustrated in FIG. 4 may be replaced by a link element in the form of a secondary cylindrical engine casing structure spaced apart from and surrounding the main engine casing 2. In this embodiment the secondary casing structure not only stiffens and strengthens the main engine casing 2 as in the embodiments of FIGS. 1 to 4, but it also provides a containment structure for containing projectiles that may pierce the main casing in the event of an engine failure.

What is claimed is:

1. A friction welded component comprising at least two structural support members spaced apart and connected by a plurality of first and second studs, each of the first studs being friction welded at one end to a first of the support members and at the opposite end thereof to one end of a respective second stud, whereby each of the second studs are friction welded to a respective first stud and a second of the support members along a continuous annular friction welded joint.

2. A friction welded component as claimed in claim 1 wherein the said continuous annular weld has a divergent cross-section.

3. A friction welded component as claimed in claim 2 wherein the continuous annular weld diverges in the direction from the first support member towards the second support member.

4. A friction welded component as claimed in claim 3 wherein the continuous annular weld has a frusto-conical configuration.

5. A friction welded component as claimed in claim 1 wherein the second stud protrudes from the second support member in the direction away from the first support member.

6. A friction welded component as claimed in claim 1 wherein each pair of welded first and second studs include a throughbore extending through the first and second support members and the said studs.

7. A friction welded component as claimed in claim 1 wherein the said first support member comprises a primary structural support member and the said second support member comprises a secondary reinforcement member.

8. A friction welded component as claimed in claim 7 wherein the second support member comprises at least one link element extending between adjacent first and second welded stud pairs.

9. A friction welded component as claimed in claim 7 wherein the first support member comprises a primary casing and the second support member comprises a containment casing for containing projectiles piercing the said primary casing.

10. A friction welded component as claimed in claim 9 comprising a plurality of containment casings spaced apart and substantially parallel to the primary casing.

11. A friction welded component as claimed in claim 1 wherein the first structural member comprises a generally cylindrical gas turbine engine casing and the said second support member is disposed on the radially outer side of the said engine casing.

12. A method of friction welding comprising the steps of;
friction welding a plurality of first studs at one end thereof to a first structural support member;
positioning a second structural member having a plurality of apertures adjacent the opposite ends of the first studs, the apertures being positioned in register with the said first studs;
friction welding a plurality of second studs to the said second support member, each of the second studs extending through a respective aperture and being friction welded along a continuous friction weld surface to the second support member and a respective first stud.

13. A method as claimed in claim 12 wherein the step of friction welding the second studs comprises the step of simultaneously welding the second stud to the respective first stud and aperture along the continuous friction weld surface of the second stud.

14. A method as claimed in claim 12 further comprising the step of providing the end of the first studs to be welded to the second studs with a recess for receiving the end of the second stud to be welded.

15. A method as claimed in claim 14 wherein each recess and respective adjacent aperture define a continuous surface which contacts the continuous weld surface of the second stud.

16. A method as claimed in claim 15 wherein the said continuous surface of the recess and aperture and the continuous surface of the second stud have corresponding frusto-conical configurations.

17. A method as claimed in claim 12 wherein the step of friction welding the said second studs to the said first studs comprises a rotary friction welding.

* * * * *